United States Patent [19]
Decore

[11] Patent Number: 5,569,884
[45] Date of Patent: Oct. 29, 1996

[54] TRUNKING WITH COVER JOINTING MEMBERS, SUITABLE FOR ELECTRICAL APPARATUS

[75] Inventor: Bertrand Decore, La Chapelle Saint Aubin, France

[73] Assignees: Legrand; Legrand SNC, both of Limoges, France

[21] Appl. No.: 234,833

[22] Filed: Apr. 28, 1994

[30] Foreign Application Priority Data

May 14, 1993 [FR] France ................................... 93 05854

[51] Int. Cl.⁶ ....................................................... H02G 3/04
[52] U.S. Cl. ............................... 174/101; 174/66; 138/92; 138/155; 220/680; 220/693
[58] Field of Search ............................... 174/101, 66, 67, 174/68.3, 95, 96, 97, 98; 138/92, 155, 156, 163; 220/693, 680

[56] References Cited

U.S. PATENT DOCUMENTS

| | | | |
|---|---|---|---|
| 3,636,984 | 1/1972 | Rauhauser | 138/155 |
| 3,697,667 | 10/1972 | Pollak et al. | 174/68.3 |
| 4,077,434 | 3/1978 | Sieckert et al. | 138/92 |
| 4,349,220 | 9/1982 | Carroll et al. | 138/92 X |
| 4,398,564 | 8/1983 | Young et al. | 138/92 |
| 5,024,251 | 6/1991 | Chapman | 138/92 |
| 5,089,667 | 2/1992 | Goussin | 174/101 |

FOREIGN PATENT DOCUMENTS

| | | |
|---|---|---|
| 0382597 | 8/1990 | European Pat. Off. . |
| 0409806 | 1/1991 | European Pat. Off. . |
| 0414616 | 2/1991 | European Pat. Off. . |
| 893636 | 4/1962 | United Kingdom . |

*Primary Examiner*—Laura Thomas
*Assistant Examiner*—Paramita Ghosh
*Attorney, Agent, or Firm*—Young & Thompson

[57] ABSTRACT

Trunking, in particular trunking for electrical apparatus, includes a body with inwardly directed lips and a cover adapted to be snap-fastened to the lips. The trunking further includes a cover jointing member extending transversely between the lips of the body to cover the end of the cover. At one end at least it is provided with a latch for locking it to the respective lip of the body.

18 Claims, 2 Drawing Sheets

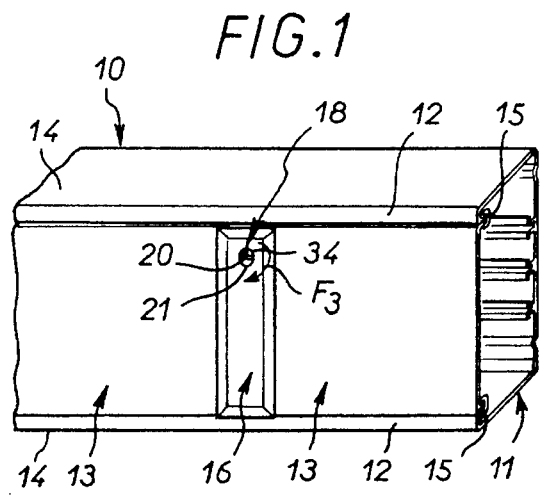
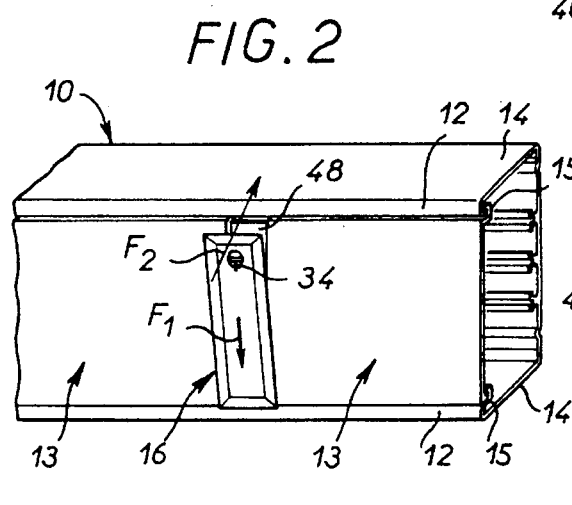
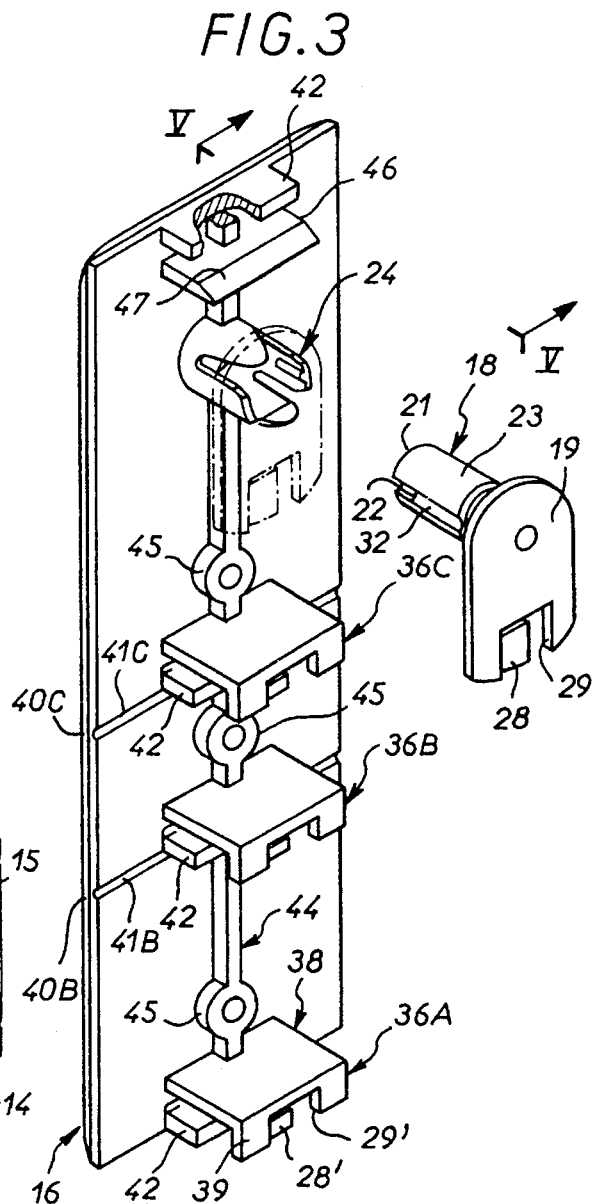
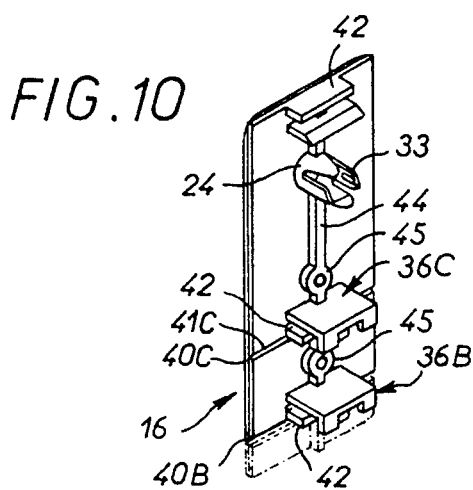
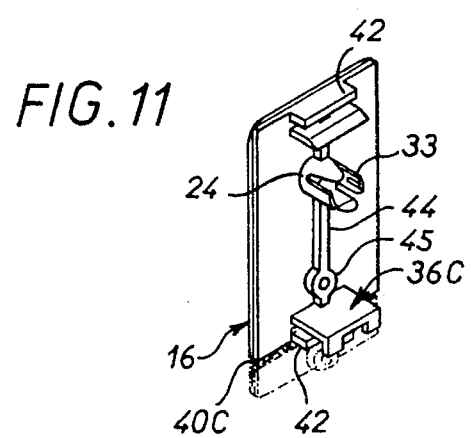

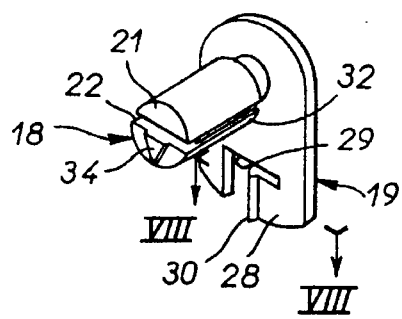
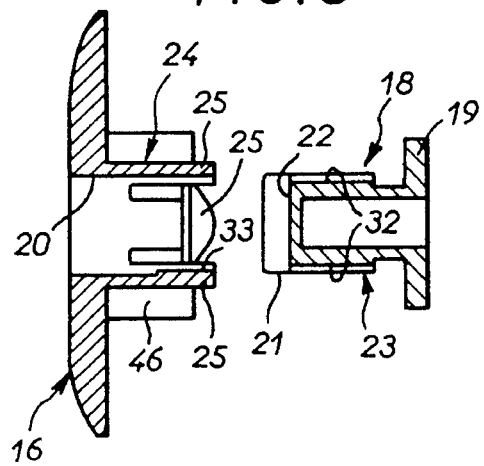
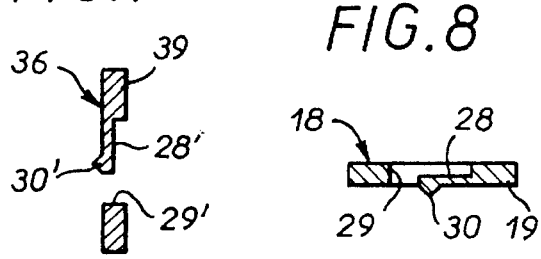
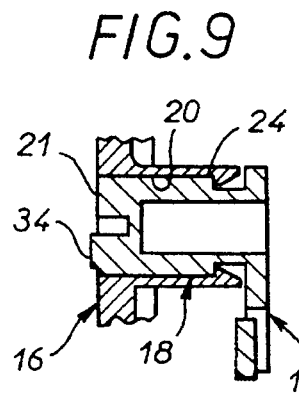
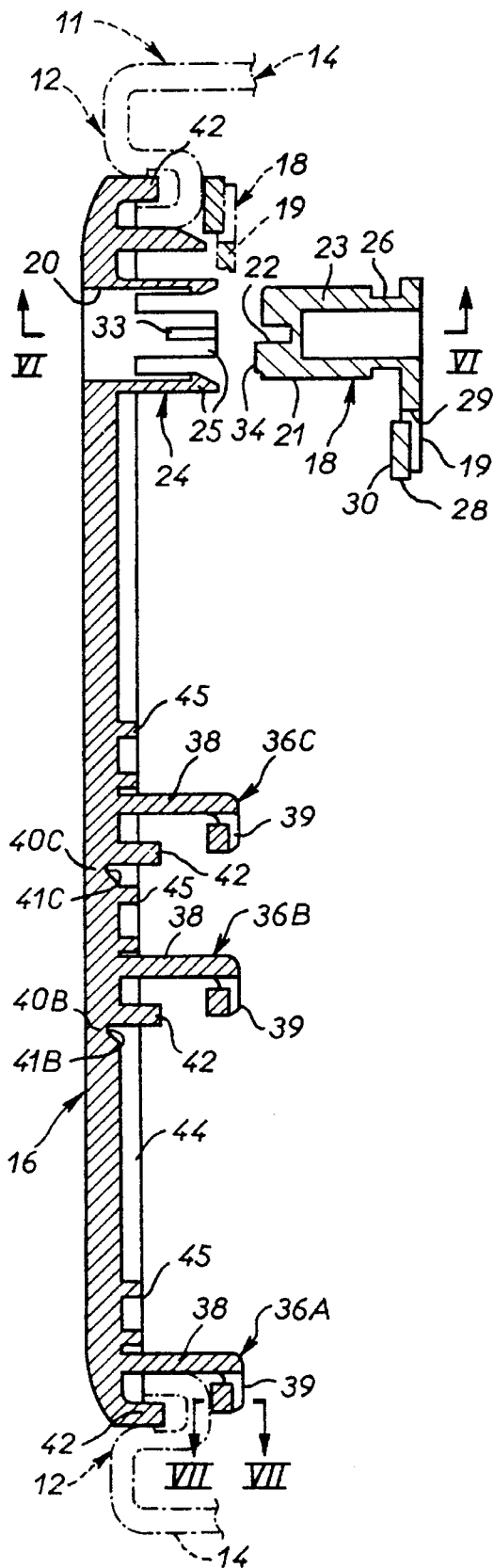

TRUNKING WITH COVER JOINTING MEMBERS, SUITABLE FOR ELECTRICAL APPARATUS

BACKGROUND OF THE INVENTION

1. Field of the Invention

The present invention is generally concerned with trunking, especially for electrical apparatus, of the kind including a body with inwardly directed lips and a cover which can be attached to the body.

2. Description of the Prior Art

It is directed both to the case where the lips on the body are directly part therefore, being carried by its side flanges, the cover extending between the side flanges and of itself closing the entire body, and the case where one or both lips are carried by a partition internal to the body, whether this is a fixed partition or a removable partition as described in French patent FR-A-2 642 911, for example, the cover extending only from one side flange to one partition or between two partitions, of itself closing only part of the body.

For reasons of simplicity it is assumed hereinafter that the lips are in all cases part of the body, even if they are carried by an internal partition removable therefrom.

The present invention is more particularly concerned with the case where snap fastener means are provided by the cover and the body for attaching the cover to the body.

The lips on the body are shaped as channels, for example, and the cover has two beads on the back adapted to snap into the lips, i.e. into the channel formed thereby.

Although this has the advantage that the cover can be attached to the body simply by forcing it into place, given the nature of the snap fastening means employed, the same cannot be said for its removal, there being virtually no means on the cover itself for getting a grip on it once fitted to the body.

However, it may be necessary to remove the cover, for example to carry out maintenance on the electrical apparatus concerned or to modify the installation.

The operative must then insert the blade of a screwdriver into the inevitable gap between one longitudinal edge of the cover and the respective lip on the body, in order to apply an extraction force to the cover by levering against the body.

This complies with relevant standards which, for safety reasons, allow for the possible need to use a tool to remove the cover.

However, using a screwdriver inevitably damages the body and/or the cover, leaving traces on one or both, to the detriment of the overall appearance.

A general object of the present invention is an arrangement which can avoid this drawback which is particularly troublesome given that during the normal service life of trunking it can be necessary to remove the cover several times.

SUMMARY OF THE INVENTION

To be more precise, the present invention consists in a trunking of the kind including a body with inwardly directed lips, a cover adapted to be snap-fastened to said lips and a cover jointing member extending transversely between the lips of the body to cover the end of the cover and which has at one end at least a latch including a retaining member, said latch being mounted to move between a locked position in which the retaining member is engaged under the respective lip of the body and an unlocked position in which the retaining member is away from this lip.

The latch is preferably mounted to rotate on the cover jointing member, for example, having on the surface of the latter an actuator head accessible to the user, and its retaining member is a plate projecting radially from its shank cantilever-fashion.

To remove the cover all that is required is to remove the cover jointing member first.

This provides sufficient space for the operative to insert one or more fingers under the cover in order to apply the necessary extraction force thereto.

This has the advantage that neither the body nor the cover is damaged.

Actuation of the cover jointing member latch in practise requires the use of a tool, a screwdriver in this instance, which has the advantage that the relevant standards are complied with.

The features and advantages of the invention emerge from the following description given by way of example with reference to the accompanying diagrammatic drawings.

BRIEF DESCRIPTION OF THE DRAWINGS

FIG. 1 is a partial perspective view of trunking including a cover jointing member according to the invention.

FIG. 2 is a partial perspective view similar to that of FIG. 1 showing the fitting of the cover jointing member.

FIG. 3 is a locally cut away perspective view to a larger scale of the cover jointing member, seen from behind, and the latch with which it is provided, before the latch is mounted on the cover jointing member.

FIG. 4 is a perspective view of the latch seen from the front and to the same scale as FIG. 3.

FIG. 5 is a longitudinal cross-section view of the cover jointing member and its latch on the line V—V in FIG. 3, and therefore before the latch is mounted, to a still larger scale.

FIG. 6 is a view in transverse cross-section on the line VI—VI in FIG. 5.

FIG. 7 is a partial transverse cross-sectional view of the cover jointing member on the line VII—VII in FIG. 5.

FIG. 8 is a similar partial transverse cross-sectional view of the latch on the line VIII—VIII in FIG. 4.

FIG. 9 is a partial longitudinal cross-sectional view corresponding to part of FIG. 5 after mounting of the latch on the cover jointing member.

FIGS. 10 and 11 are perspective views to a smaller scale, derived from FIG. 3 and each showing a respective mode of operation of the cover jointing member to suit two different widths of cover.

DETAILED DESCRIPTION OF THE PREFERRED EMBODIMENT

Referring to the figures, and in particular to FIGS. 1 and 2, trunking 10 includes a body 11 with inwardly directed lips 12 and a cover 13 adapted to be snap-fastened to the lips 12.

In the embodiment shown the cover 13 is in two parts or sections, just as if two covers 13 were to be one next to another along the length of the body 11.

For reasons of simplicity, however, reference is usually made hereinafter to only one cover 13.

The body 11 is well known in itself and its features are conventional and well known per se it is not described in detail here.

The same applies to the cover 13.

Only the component parts of the body 11 and/or the cover 13 relevant to an understanding of the invention are described hereinafter.

Suffice to say that in the embodiment shown the body 11 has a generally U-shaped transverse cross-section, that its lips 12 are carried by its side flanges 14, extending at the same level along the free edges of the side flanges, and that each lip 12 is generally channel-shaped, as shown more clearly in chain-dotted outline in FIG. 5.

In this embodiment, the cover 13 extends between the side flanges 14 of the body 11 and has two beads 15 projecting from its back for snap-fastening it into the channels on the lips 12 of the body.

According to the invention, the trunking 10 also includes a cover jointing member 16 extending transversely between the lips 12 of the body 11 to cover the end of the cover 13 and having at one end at least a latch 18 including a retaining member 19, the latch 18 being moveable between a locked position shown in chain-dotted outline in FIG. 5 in which the retaining member 19 is engaged under the respective lip 12 of the body 11 and an unlocked position shown in continuous outline in FIG. 5 in which the retaining member 19 is away from the lip 12.

The cover jointing member 16 comprises a rectangular plate.

In the embodiment shown, the latch member or latch 18 is mounted to rotate at the cover jointing member 16 and has on the surface of the cover jointing member an actuator head 21 accessible to the user through a circular opening 20 provided for this purpose in the cover jointing member 16.

The actuator head 21 has a diametral slot 22 like the head of a screw so that it can be operated using a screwdriver.

The latch 18 has a circular cylindrical shank 23 whose free end forms the actuator head 21. The cylindrical shank 23 is snap-fastened axially into a well 24 in which it can rotate; is continuous with the opening 20 and which therefore projects from the well rearwardly the back of the cover jointing member 16.

In the embodiment shown, the well 24 is subdivided along its generatrices into elastically deformable lugs 25 and to enable axial snap-fastening of the latch 18 at least some of the detents or 25, in this instance two diametrally opposed detents or lugs 25, are hook-shaped.

Where it joins with the retaining member 19, the shank 23 of the latch 18 has an annular groove 26 adapted to cooperate with the hook-shaped lugs 25.

In the embodiment shown, the retaining member 19 of the latch 18 is a plate projecting radially from its shank 23, cantilever fashion, at the end of the latter opposite the actuator head 21.

In this embodiment, the retaining member 19 also includes an elastically deformable tab 28 adapted to cooperate with a lip 12 of the body 11.

In practise the elastically deformable tab 28 is disposed in a notch 29 of the retaining member 19, and lies substantially within the thickness or a wall thereof, although the actual tab is thinner than the wall. It has a transversely projecting bead 30 adapted to bear against a lip 12 of the body 11, on the back of the bright portion of the channel-shaped part of the lip 12.

As shown here, the bead 30 has a triangular profile in transverse cross-section, for example.

Also as shown here, indexing means are preferably provided between the latch 18 and the cover jointing member 16 for at least one position of the latch 18.

In the embodiment shown, the indexing means include two slots 32 at diametrally opposed positions on the latch 18, running along generatrices of the shank 23, between the slot 22 in the actuator head 21 and the groove 26 in the flange 23. There is a complementary rib 33 (see FIG. 6) on one of the lugs 25 of the well 24 of the cover jointing member 16, in this instance one of the lugs 25 between the hook-shaped lugs.

As shown here, the actuator head 21 of the latch 18 preferably carries an index mark 34 indicating the position of the retaining member 19.

In the embodiment shown the index mark 34 is in relief and has a triangular contour as seen in plan view with its point on the same side as the retaining member 19.

In the embodiment shown the cover jointing member 16 is provided with a latch 18 at one end only and has at its other end, projecting from the back, a hook 36 adapted to engage over the respective lip 12 of the body 11.

The hook 36A has a leg 38 extending transversely to the respective transverse edge of the cover jointing member 16 and a lip 39 projecting lengthwise of the free edge of the leg 38, cantilever fashion, perpendicular to the leg 38 on the same side as the respective transverse edge of the cover jointing member 16.

The hook 36A preferably includes an elastically deformable tab 28' adapted to cooperate with a lip 12 of the body 11.

By virtue of arrangements similar to those already described, this elastically deformable tab 28' is disposed in a notch 29' in the lip 39, substantially within the wall thereof, being thinner itself, and carries a transversely projecting bead 30' having a triangular profile in transverse cross-section adapted to bear against a lip 12 of the body 11.

To suit different widths of cover 13, the cover jointing member 16 in practise includes a plurality of hooks 36A, 36B, 36C projecting from its back and spaced along its length and, extending transversely across its full width between the hooks 36A, 36B, 36C, frangible zones 40, each between two hooks 36 and near one of the latter, for snapping it off to length.

In the embodiment shown there are three hooks 36: 36A, 36B and 36C, all identical and all identically oriented.

Near the hooks 36B, 36C there are two weaker areas 40: 40B and 40C, in the form of grooves 41B, 41C on the back of the cover jointing member 16 locally reducing its thickness.

It is for reasons of simplicity that the hooks 36 are sometimes referred to collectively herein by their common reference number 36 and sometimes by their specific reference numbers 36A, 36B or 36C.

In the embodiment shown, the cover jointing member 16 has a transverse rib 42 projecting from its back at each end, level with its free transverse edges, for engagement in the lips 12 of the body 11, to be more precise in the channel-section of the lips 12.

In practise a transverse rib 42 is associated with each of hooks 36.

The transverse rib 42 is parallel to the leg 38 of the hook 36, extends over the entire width of the leg 38, and is on the same side thereof as the lip 39.

Its height being less than that of the leg 38, however, the transverse rib 42 leaves a gap between it and the lip 39 on the leg 38.

In the specific case of the hooks 36B, 36C, the transverse rib 42 runs alongside the respective groove 41B, 41C.

In the embodiment shown, the cover jointing member 16 further comprises a longitudinal rib 44 projecting from rearwardly its back whose height is less than that of its transverse ribs 42. The rib 44 can be discontinuous.

In practise the longitudinal rib 44 extends substantially over the entire length of the cover jointing member 16, and is locally interrupted by a circular boss 45 near each hook 36.

In the embodiment shown, the cover jointing member 16 finally includes a guide rib 46 projecting transversely from its back, associated with its latch 18 and at a distance from its respective transverse edge, adapted to contact the respective lip 12 of the body 11.

The guide rib 46 is parallel to the respective transverse rib 42 and spaced therefrom, lying between it and the well 24. It is the same length as the transverse rib 42 but higher than the latter.

On the side towards the transverse rib 42 its free edge incorporates a chamfer 47.

So as not to interfere with the engagement of the cover jointing member 16 onto a cover 13, all the component parts of the cover jointing member 16 projecting from its back, such as the well 24, the hooks 36A, 36B, 36C, the ribs 42 and 46, are set back from its longitudinal edges so that they extend transversely across only its central area.

As shown diagrammatically by the arrow F1 in FIG. 2, to fit it the cover jointing member 16 according to the invention is engaged slantwise by one hook 36A, 36B, 36C, the hook 36A, for example, on the respective lip 12 of the body 11, at the end of a cover 13 or between two sections of the cover 13, with the retaining member 19 of this latch 18 directed towards this lip 12, as shown in chain-dotted outline in FIG. 3 and in continuous outline in FIG. 9.

The latch is then in the stable unlocked position.

The cover jointing member 16 is then pressed against the other lip 12 of the body 11 as shown by the arrow F2 in FIG. 2.

This is controlled by the guide rib 46 and facilitated by the chamfer 47 thereon. The latch 18 is then turned 180°, as shown by the arrow F3 in FIG. 1, by applying a screwdriver (not shown) to its actuator head 21.

The latch 18 is thus moved from its previous unlocked position to its stable locked position in which its retaining member 19 is engaged under the respective lip 12 of the body 11, as shown in chain-dotted outline in FIG. 5.

The elastically deformable tab 28 of the retaining member 19 advantageously takes up any play at this point.

Likewise, the elastically deformable tab 28' of the hook 36A advantageously absorbs any play.

Because of the longitudinal rib 44, which at best bears against the edge of the channel-section of the lips 12 of the body 11, there remains sufficient space to insert a cover 13 under the cover jointing member 16, on either side of the components projecting from its back.

The overlies jointing member 16 can therefore cover part of 13.

The cover 13 can be slid under the cover jointing member 16 to adjust its position if necessary.

Conversely, the cover jointing member 16 can be slid over an adjacent edge portion of the cover 13.

To remove the cover 13 the cover jointing member 16 is removed first, in reverse order to that just described.

The gap 48 exposed by removing the cover jointing member 16 (see FIG. 2) enables the user to insert one or more fingers under the cover 13 to be removed in order to apply the necessary force to extract it.

Depending on the width of the cover 13, the cover jointing member 16 is snapped off at one of the frangible zones 40B, 40C, as shown in chain-dotted outline in FIGS. 10 and 11.

Of course, the present invention is not restricted to the embodiment described and shown but encompasses any variant execution thereof.

In particular, the latch of the cover jointing member can be a sliding latch rather than a rotating latch.

Also, as mentioned, the field of application of the invention encompasses the case where one or both lips on the trunking body, onto which a cover must be snap-fastened, are carried by an internal fixed or removable partition of the body.

There is claimed:

1. Trunking including a body with inwardly directed lips, a cover snap-fastenable to said lips and a cover jointing member extending transversely between said lips of said body to overlie an end of said cover and having at least at one end a latch including a retaining member, said latch being mounted to move between a lock position in which said retaining member is engaged under a respective one of said lips of said body and an unlocked position in which said retaining member is spaced from and out of engagement with the respective one of said lips said latch being mounted to rotate on said cover jointing member and having an actuator head at a surface of said cover jointing member accessible to a user.

2. Trunking according to claim 1 wherein said latch has a shank and is snap-fastenable into a well projecting rearwardly from a back surface of said cover jointing member.

3. Trunking according to claim 1 wherein said latch includes a shank, and said retaining member of said latch is a plate projecting radially in cantilever-fashion from the shank.

4. Trunking according to claim 1 wherein said actuator head of said latch carries an index mark indicating the position of said retaining member.

5. Trunking including a body with inwardly directed lips, a cover snap-fastenable to said lips and a cover jointing member extending transversely between said lips of said body to overlie an end of said cover and having at least at one end a latch including a retaining member, said latch being mounted to move between a locked position in which said retaining member is engaged under a respective one of said lips of said body and an unlocked position in which said retaining member is spaced from and out of engagement with the respective one of said lips, said retaining member of said latch including an elastically deformable tab cooperable with the respective one of said lips of said body, said latch including a shank, said retaining member of said latch being a plate projecting radially from the shank cantileverfashion and said elastically deformable tab being disposed in a notch of said retaining member and substantially within opposed faces of the retaining member.

6. Trunking including a body with inwardly directed lips, a cover snap-fastenable to said lips and a cover jointing member extending transversely between said lips of said body to overlie an end of said cover and having at least at one end a latch including a retaining member, said latch being mounted to move between a lock position in which said retaining member is engaged under a respective one of said lips of said body and an unlocked position in which said retaining member is spaced from the respective one of said lips, said retaining member of said latch including an elastically deformable tab cooperable with the respective one of said lips of said body, indexing means being provided between said latch and said cover jointing member for at least one of said positions of said latch.

7. Trunking including a body with inwardly directed lips, a cover snap-fastenable to said lips and a cover jointing member extending transversely between said lips of said body to overlie an end of said cover and having at least at one end a latch including a retaining member, said latch being mounted to move between a locked position in which said retaining member is engaged under a respective one of said lips of said body and an unlocked position in which said retaining member is spaced from the respective one of said lips, said retaining member of said latch including an elastically deformable tab cooperable with the respective one of said lips of said body, the elastically deformable tab having a transversely projecting bead adapted to bear against the respective one of said lips.

8. Trunking including a body with inwardly directed lips, a cover snap-fastenable to said lips and a cover jointing member extending transversely between said lips of said body to overlie an end of said cover and having at least at one end a latch including a retaining member, said latch being mounted to move between a locked position in which said retaining member is engaged under a respective one of said lips of said body and an unlocked position in which said retaining member is spaced from said respective one of said lips, said lips of said body being generally channel-shaped and said cover jointing member having a transverse rib projecting rearwardly from a back portion of the cover jointing member and at each end thereof for engagement in said respective one of said lips.

9. Trunking according to claim 8 wherein, to suit different cover widths, said cover jointing member comprises a plurality of hooks spaced along a length thereof and projecting from the back thereof and, across the entire width thereof, and disposed between respective ones of said hooks, frangible zones being each disposed between respective ones of said hooks for snapping off one or more sections of the cover jointing member, and a transverse rib being disposed adjacent each of said hooks of said cover jointing member.

10. Trunking according to claim 8 wherein said cover jointing member has a longitudinal rib projecting rearwardly from the back portion thereof, the height of the longitudinal rib being less than that of the transverse ribs, and the longitudinal rib being adapted to limit its engagement in said lips of said body.

11. Trunking comprising a generally U-shaped body having opposed side flanges and a transverse intermediate portion therebetween, inwardly directed lips disposed at edges of said side flange remote from said intermediate portion, first snap fastening members provided on the lips and cooperable with second snap fastening members provided along longitudinal edges of a cover, said first and second snap fastening members defining snap-fastening means with one another, a cover jointing member having ribs engageable with the first snap fastening means on the lips and retaining members cooperable with the lips opposite said ribs, at least one of the retaining members being part of a latch mounted for movement on the cover jointing member between a lock position in which the at least one retaining member is engaged under a respective one of said lips and an unlocked position in which the retaining member is out of engagement with said respective one of said lips. whereby removal of said jointing member provides access to an adjacent edge of said cover for removal of the cover.

12. Trunking according claim 11 wherein said retaining member of said latch includes an elastically deformable tab cooperable with the respective one of said lips of said body.

13. Trunking according to claim 11 wherein said cover jointing member has said latch at one end only and includes a hook projecting from a back portion of the cover jointing member at an opposite end thereof and adapted to be engaged over a corresponding one of said lips of said body.

14. Trunking according to claim 13 wherein said hook of said cover jointing member includes an elastically deformable tab adapted to cooperate with the corresponding one of said lips of said body.

15. Trunking according to claim 14 wherein said hook includes a leg and a cantilevered lip and said elastically deformable tab is disposed in a notch of said cantilevered lip and substantially within opposed faces of the cantilevered lip.

16. Trunking according to claim 15 wherein the elastically deformable tab has a transversely projecting bead adapted to bear against the corresponding lip of the body.

17. Trunking according to claim 13 wherein, to suit different cover widths, said cover jointing member comprises a plurality of hooks spaced, along its length and projecting from a back portion thereof and, frangible zones running across the entire width of the cover jointing member, and disposed between respective ones of the hooks, each of the frangible zones being disposed between respective ones of the hooks for snapping off one or more sections of the cover jointing member.

18. Trunking according to claim 11 wherein components projecting from a back portion of said cover jointing member extend transversely across a central area of said cover jointing member, set back from longitudinal edges of said cover jointing member.

\* \* \* \* \*